US008483203B2

(12) United States Patent  
Zhu et al.

(10) Patent No.: US 8,483,203 B2  
(45) Date of Patent: Jul. 9, 2013

(54) TECHNIQUES FOR FORMATTING SIGNALS FOR TRANSMISSION USING A WIRELESS NETWORK

(75) Inventors: Yuan Zhu, Beijing (CN); Qinghua Li, San Ramon, CA (US); Xiangying Yang, Portland, OR (US); Xiaogang Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 12/962,045

(22) Filed: Dec. 7, 2010

(65) Prior Publication Data

US 2011/0268102 A1    Nov. 3, 2011

Related U.S. Application Data

(60) Provisional application No. 61/330,837, filed on May 3, 2010.

(51) Int. Cl.
   *H04J 3/00* (2006.01)
(52) U.S. Cl.
   USPC .......................................................... 370/345
(58) Field of Classification Search
   USPC .......................................... 370/254–340, 345
   See application file for complete search history.

(56) References Cited

U.S. PATENT DOCUMENTS

| 2008/0267269 | A1  | 10/2008 | Enescu et al. | |
|---|---|---|---|---|
| 2009/0175159 | A1  | 7/2009 | Bertrand et al. | |
| 2009/0181690 | A1* | 7/2009 | McCoy et al. | 455/452.1 |
| 2009/0186613 | A1  | 7/2009 | Ahn et al. | |
| 2009/0232107 | A1  | 9/2009 | Park et al. | |
| 2009/0239476 | A1  | 9/2009 | Womack et al. | |
| 2009/0323602 | A1  | 12/2009 | Li et al. | |
| 2010/0040001 | A1  | 2/2010 | Montojo et al. | |
| 2010/0040005 | A1  | 2/2010 | Kim et al. | |
| 2010/0067512 | A1  | 3/2010 | Nam et al. | |
| 2010/0069028 | A1  | 3/2010 | Choi et al. | |
| 2010/0091903 | A1* | 4/2010 | Castelain et al. | 375/295 |
| 2011/0110307 | A1* | 5/2011 | Ko et al. | 370/328 |
| 2011/0228742 | A1* | 9/2011 | Honkasalo et al. | 370/330 |
| 2011/0237270 | A1* | 9/2011 | Noh et al. | 455/450 |

FOREIGN PATENT DOCUMENTS

| JP | 2002-131423 A | 5/2002 |
|---|---|---|
| KR | 10-2009-0082867 A | 7/2009 |
| WO | 2011/109796 A2 | 9/2011 |
| WO | 2011/139458 A2 | 11/2011 |
| WO | 2011/109796 A3 | 1/2012 |
| WO | 2011/139458 A3 | 2/2012 |

OTHER PUBLICATIONS

International Search Report and Written Opinion Received for PCT Patent Application No. PCT/US2011/027325, Mailed on Dec. 7, 2011, 12 pages.

(Continued)

*Primary Examiner* — Ayaz Sheikh  
*Assistant Examiner* — Debebe Asefa  
(74) *Attorney, Agent, or Firm* — Glen B Choi

(57) ABSTRACT

Techniques are described for forming signals for transmission to a receiver. Two transmitters can form resource blocks with different Physical Uplink Control Channel (PUCCH) demodulation reference signal (DMRS) patterns that are orthogonal over time and/or frequency to each other. The transmitters can simultaneously transmit the same resource block but with different DMRS patterns. If a receiver is mounted with two antennas, the receiver can utilize a MIMO receiver to differentiate resource blocks from two transmitters.

21 Claims, 9 Drawing Sheets

OTHER PUBLICATIONS

Sesia et al., "Section 19.3 Random Access Procedure", LTE, The UMTS Long Term Evolution: From Theory to Practice, Wiley Publishers, Apr. 2009, pp. 423-428.

International Preliminary Report on Patentability received for PCT Patent Application No. PCT/US2011/027325, Mailed on Sep. 20, 2012, 7 pages.

Office Action Received for U.S. Appl. No. 13/041,125, Mailed on Dec. 10, 2012, 17 pages.

LTE; ETSI TS 136 211 V8.3.0; "Evolved Universal Terrestrial Radio Access (E-UTRA); Physical channels and modulation", pp. 16-31, Nov. 2008.

International Preliminary Report on Patentability received for PCT Patent Application No. PCT/US2011/031180, mailed Nov. 15, 2012, 12 pages.

Introduction of Rel-10 LTE-Advanced features in 36.211, 3GPP TSG-RAN Meeting #63, R1-106412, Version 9.1.0, Nov. 15-19, 2010.

International Search Report and Written Opinion received for PCT Patent Application No. PCT/US2011/031180, mailed on Dec. 13, 2011, 9 pages.

Office action received for U.S. Appl. No. 13/041,125, mailed on May 21, 2013, 14 pages of Office Action.

* cited by examiner

TECHNIQUES FOR FORMATTING SIGNALS FOR TRANSMISSION USING A WIRELESS NETWORK

RELATED ART

This application is related to U.S. Patent Application No. 61/330,837, filed May 3, 2010 and claims priority therefrom.

FIELD

The subject matter disclosed herein relates generally to techniques used by mobile devices for formatting signals for transmission.

RELATED ART

Long Term Evolution-Advanced (LTE-A) proposes to increase the maximum downlink bandwidth to 100 MHz to meet a 1 Gbps peak data rate target. Carrier aggregation is one technique introduced to increase maximum downlink bandwidth. For example, in some cases, one LTE-A user element (UE) is able to receive five 20 MHz carriers concurrently. On the other hand, uplink (UL) feedback information also increases almost linearly to enable the five concurrently received downlink (DL) carriers to work properly. For example, UL feedback can include channel quality indicator (CQI), precoding matrix indicator (PMI), rank indicator (RI), HARQ ACK/NACK and uplink scheduling requests bits. It has been proposed in 3GPP TR 36.814 v9.0.0 (2010) that feedback for multiple DL CC be sent over the same uplink component carriers (UL CC) using one Physical Uplink Control Channel (PUCCH).

3GPP LTE Rel-8 (2008) proposes two channel formats for PUCCH: PUCCH format 1/1a/1b and PUCCH format 2/2a/2b. A higher bit rate for feedback channel may be needed when more advanced features are introduced in LTE-A Rel-10 or future releases such as Coordinated Multiple Point (CoMP), described in 3GPP TR 36.814 v9.0.0 (2010). It has been widely acknowledged that the maximum payload size of PUCCH be increased to provide acceptable feedback when carrier aggregation is used.

BRIEF DESCRIPTION OF THE DRAWINGS

Embodiments of the present invention are illustrated by way of example, and not by way of limitation, in the drawings and in which like reference numerals refer to similar elements.

FIGS. 5 and 6 depict respective PUCCH formats 4 and 4a.

DETAILED DESCRIPTION

Figure 1:
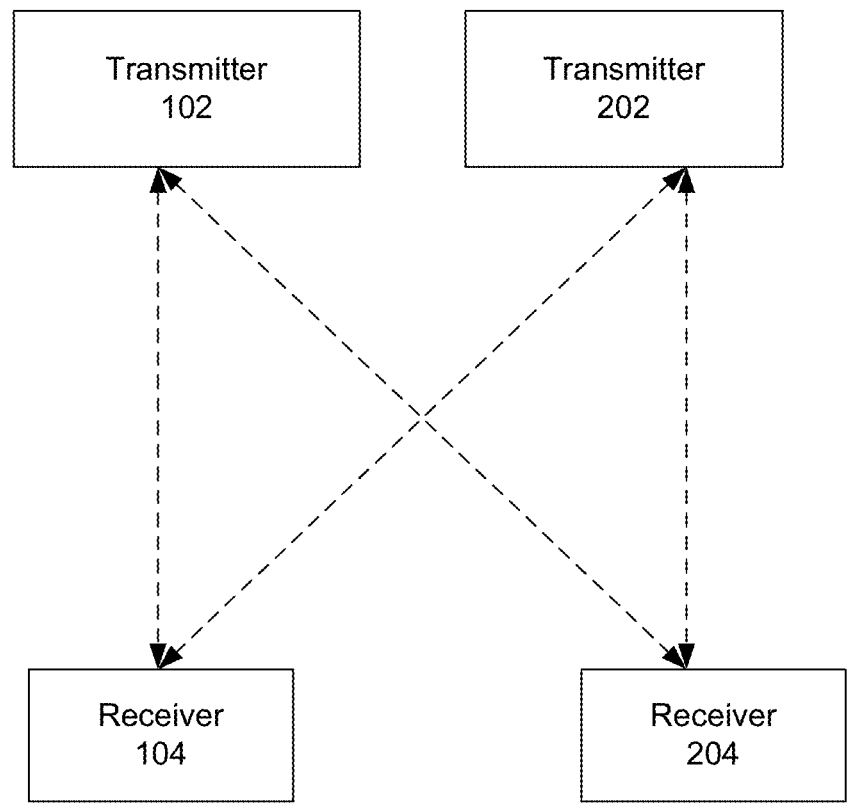
FIG. 1 depicts an example of devices connected using a wireless network.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e, 802.16m, 3GPP standards, physical layer description of 3GPP LTE advanced 36211 release 10, and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments of the invention may be used in various other apparatuses, devices, systems and/or networks.

Some embodiments provide a manner for one or more mobile devices to format signals for transmission. Signals can be used to transmit feedback. One signal format provides for multiplying data by one or more orthogonal codes to provide encoded data symbols and scheduling resulting encoded data symbols for transmission using multiple sub-carrier frequencies and multiple time slots. The orthogonal codes can be orthogonal in a time or frequency domain to one or more other time or frequency slot. Accordingly, use of orthogonal codes minimizes interference among encoded data bits. Another signal format provides for scheduling of data without encoding for transmission using multiple sub-carrier frequencies and multiple time slots. Signal formats described herein can include a demodulation reference signal (DMRS) that is scheduled for transmission using multiple sub-carrier frequencies and multiple time slots. The DMRS format can be any of frequency and time domain orthogonal codes. Consequently, an amount of simultaneous uplink feedback from multiple mobile transmitters to a base station receiver can be increased.

Various embodiments provide PUCCH formats with potentially larger payload sizes than those of PUCCH formats 1 and 2 and with coding rates that are potentially related to the number of downlink component carriers (DL CCs) that the PUCCH uses for feedback. The design of various embodiments can be based on DFT-S-OFDM in the data region. DFT-S-OFDM is described in 3G LTE at section 5.4.2a of 36.211 v10, which is not yet finalized.

FIG. 1 depicts an example of devices connected using a wireless network. The network can be compliant with any variety of IEEE 802.16 or 3GPP LTE as well as variations and revisions thereof. In the downstream or downlink case, the generically-named transmitters 102 and/or 202 above may be interchangeably referred to as a base station (BS) or enhanced Node B (eNB) or access point (AP). In this downlink case, the receivers 104 and/or 204 above may be interchangeably referred to as a mobile station (MS) or subscriber station (SS) or user equipment (UE) or station (STA) at the system level herein. Further, the terms BS, eNB, and AP may be conceptually interchanged, depending on which wireless protocol is being used, so a reference to BS herein may also be seen as a reference to either of eNB or AP. Similarly, a reference to MS or SS herein may also be seen as a reference to either of UE or STA.

Figure 2:
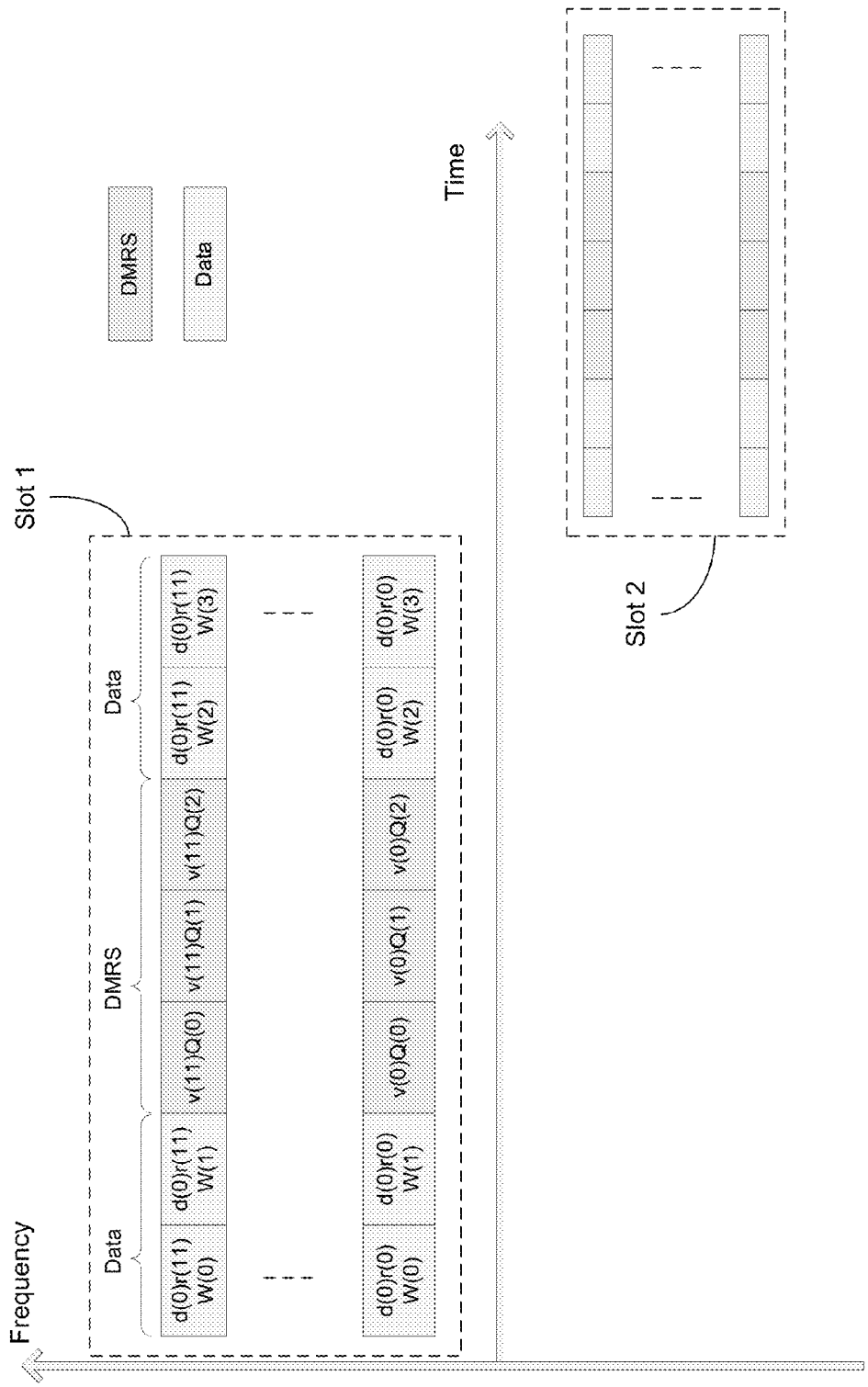
FIG. 2 depicts an example of a channel structure of PUCCH format 1/1a/1b in which two slots are transmitted using a resource block.

FIG. 2 depicts an example of a channel structure of PUCCH format 1/1a/1b in which two slots are transmitted using a resource block. PUCCH format 1/1a/1b is described for example in 3GPP TS 36.211 v8.3.0, "Physical Channels and Modulation", May 2008. PUCCH format 1/1a/1b uses spreading over frequency and time domains to convey 1 or 2 bits of data. The 1 or 2 bits of information can be modulated into one data symbol d(0) using BPSK or QPSK modulation. Slot 1 can convey data symbol d(0) and, although not depicted, slot 2 can convey the same data symbol d(0).

For PUCCH format 1/1a/1b, one data symbol d(0) is first spread in the frequency domain using a length 12 orthogonal code $r_i$, where $r_i=[r_i(0), r_i(1), r_i(2), r_i(3), r_i(4), r_i(5), r_i(6), r_i(7), r_i(8), r_i(9), r_i(10),$ and $r_i(11)]$. Spreading can include the same data symbol being multiplied by different r values and the product placed in different sub carriers. In total, there could be 12 orthogonal sequences defined, where $0<=i<=11$. The r values in different subscript i values can be orthogonal, i.e., non-interfering. Note that subscript i is not shown in the figures for simplicity. Each of the 12 spread symbols can be further spread using a length 4 time domain orthogonal cover $W_j$, where $W_j=[W_j(0)\ W_j(1)\ W_j(2)\ W_j(3)]$. Spreading can include the same data symbol being multiplied by different W values and the product placed in different OFDM symbols. In total, there could be 4 orthogonal sequences defined where $0<=j<=3$. Each (i, j) value can refer to a unique UE. Note that subscript j is not shown in the figures for simplicity.

In slot 1, data symbol d(0) is multiplied by each value of sequence $r_i$ and also multiplied by each value of orthogonal cover $W_j$. The product of each multiplication is a modulated data symbol. Each modulated data symbol is scheduled for transmission in a different frequency and time slot combination. Similarly, slot 2 can include the same data symbol d(0) or a different data value. The data symbol used for slot 2 can be multiplied by each value of sequence $r_i$ and also multiplied by each value of orthogonal cover $W_j$. The product of each multiplication is a modulated data symbol. Each modulated data symbol is scheduled for transmission in a different frequency and time slot.

For PUCCH format 1/1a/1b, demodulation reference signal (DMRS) values include multiplication of a time orthogonal code by a frequency orthogonal code. In the DMRS portion, values v(0)-v(11) represent a 12 symbol frequency domain orthogonal code and values Q(0)-Q(2) represent a 3 symbol time domain orthogonal code. The procedure for generating the DMRS portion can be similar to that used to generate the data portion except that the three orthogonal cover symbols are used and no data symbol is spread. Thus, simultaneous transmission by a maximum by 36 UEs of the same resource block in the data portion can occur and simultaneous transmission by a maximum of 36 UEs in the DMRS portion can occur.

If binary phase shift keying (BPSK) is used for the data symbol, 1 bit can be carried using PUCCH format 1a. If Quadrature Phase Shift Keying (QPSK) is used for the data symbol, 2 bits can be carried using PUCCH format 1b. PUCCH format 1 can use ON-OFF keying for an eNB to detect if the signal (e.g., resource block) is present or not.

Figure 3:
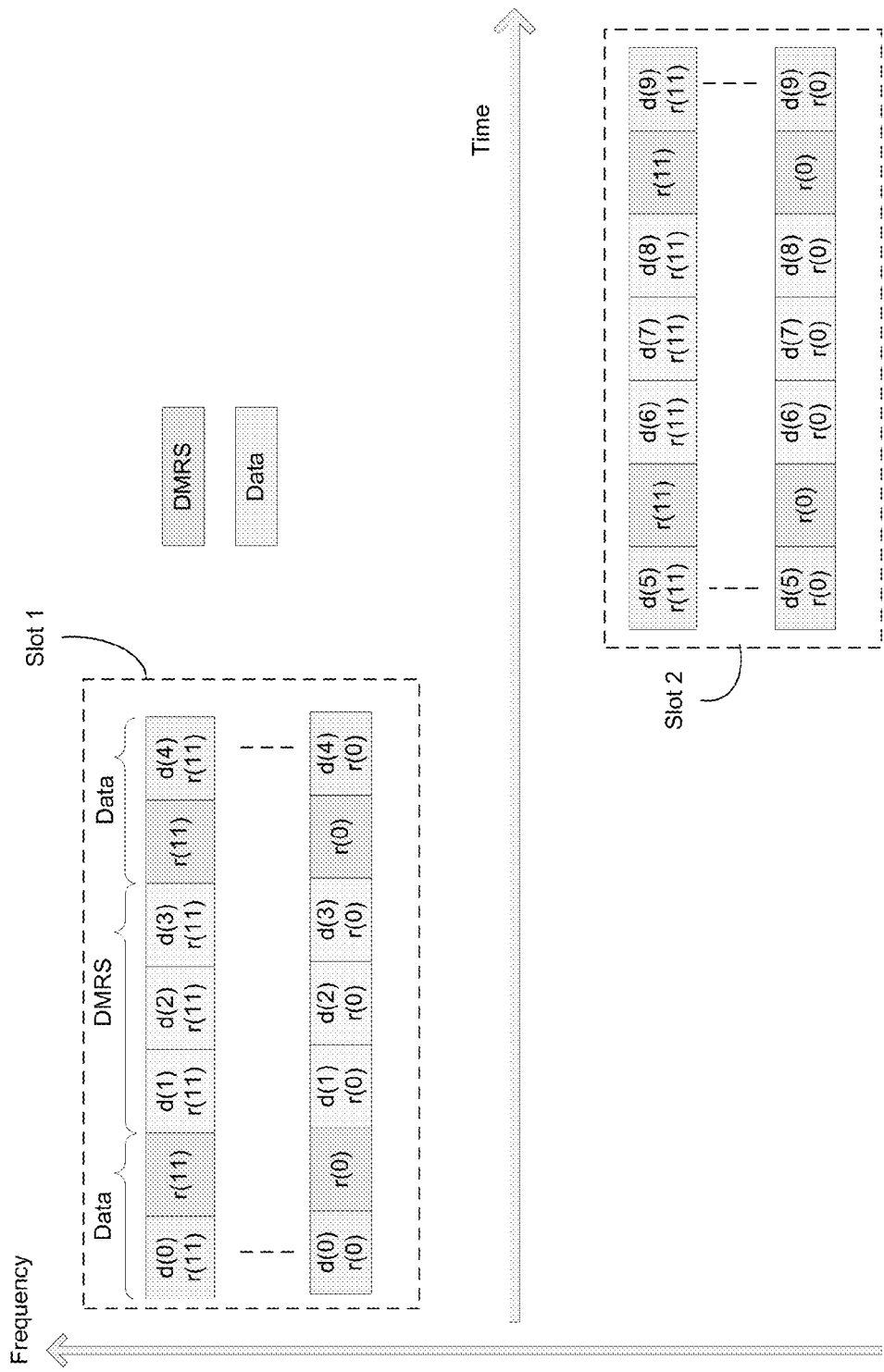
FIG. 3 depicts an example of a channel structure of a PUCCH format 2/2a/2b in which two slots are transmitted using a resource block.

FIG. 3 depicts an example of a channel structure of a PUCCH format 2/2a/2b in which two slots are transmitted using a resource block. PUCCH format 2/2a/2b is described for example in 3GPP TS 36.211 v8.3.0, "Physical Channels and Modulation", May 2008. For PUCCH format 2/2a/2b, instead of forming and transmitting an orthogonal cover in the time domain, data symbols are spread in the frequency domain using a frequency orthogonal code $r_i$, described earlier. In some cases, 5 data symbols (d(0) to d(4) or d(5) to d(9)) can be sent in each slot. Data values d(0) to d(9) are multiplied by each value of the orthogonal cover sequence $r_i$ and assigned to different time and frequency locations.

For PUCCH format 2, when QPSK is used to modulate the ten data symbols d(0) to d(9), the overall number of encoded bits is 20. Formats 2a and 2b are not shown in FIG. 2. In the case PUCCH format 2a is used, an additional bit will be carried using the phase offset of two DMRS OFDM symbols. A phase offset can be used for one BPSK symbol. When PUCCH format 2b is used, one QPSK will be modulated using the offset to carry an additional 2 bits. In some cases, a maximum of 12 UEs can simultaneously transmit the same format 2/2a/2b resource block.

For PUCCH format 2/2a/2b, DMRS values are the frequency orthogonal codes $r_i$ and are not transmitted using the frequency and time slots allocated for DMRS. Instead, the DMRS values are allocated during carrier and time slots allocated for data.

Both formats 1/1a/1b and 2/2a/2b use a time domain multiplexing (TDM) structure where the data and demodulation reference signal (DMRS) are multiplexed in the time domain.

Figure 4:
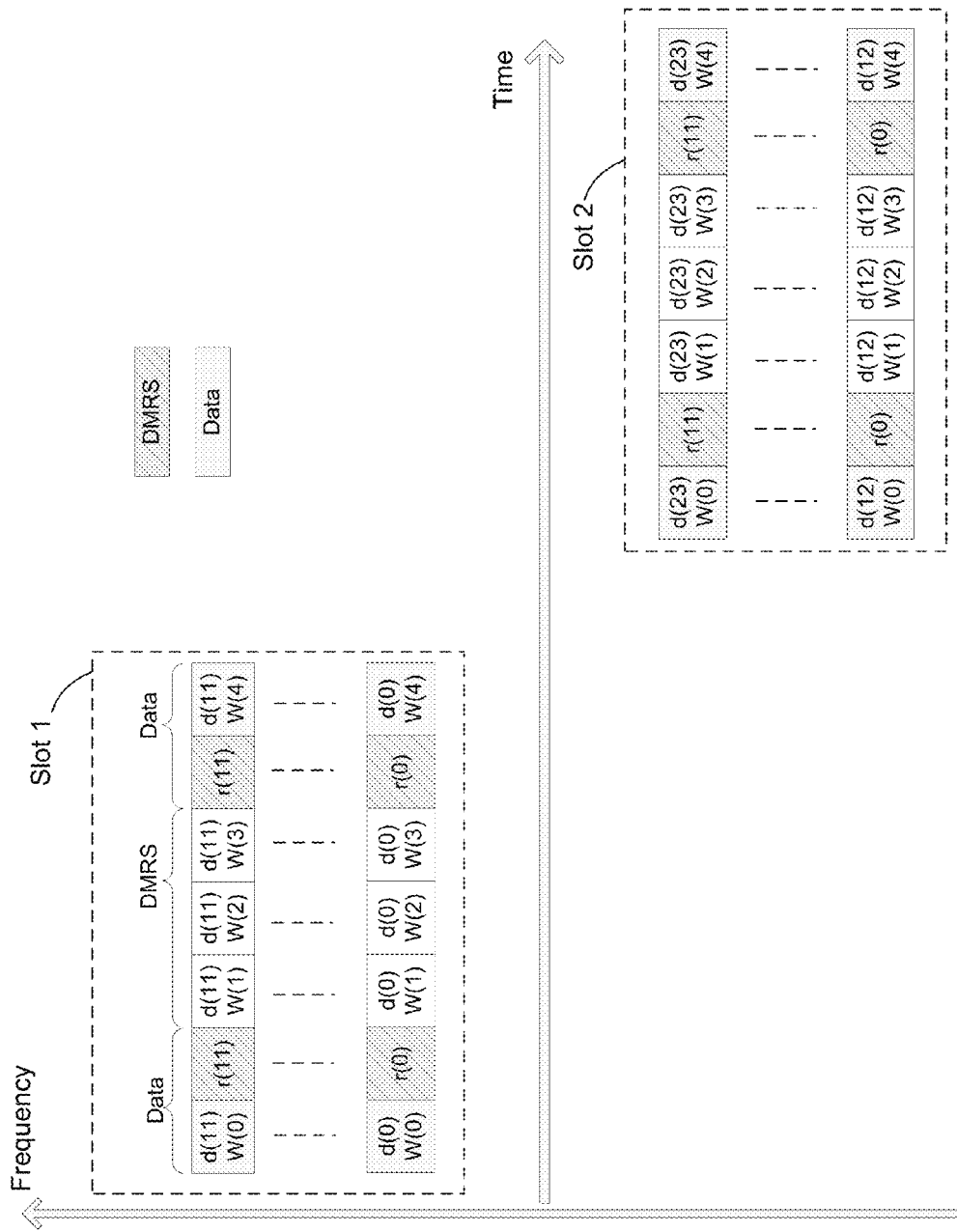
FIG. 4 illustrates a PUCCH format 3.

FIG. 4 illustrates a PUCCH format for using time domain spreading of data, in accordance with an embodiment. Herein, the PUCCH format of FIG. 4 is referred to as PUCCH format 3. In some cases, PUCCH format 3 can carry more data symbols than can PUCCH format 2, described with regard to FIG. 3. The PUCCH format 3 can use the data mapping and DMRS schemes from PUCCH format 1/1a/1b, described with regard to FIG. 2. In some cases, PUCCH format 3 can convey 24 data symbols d(0) to d(23). The first 12 data symbols can be conveyed using slot 1 and the second 12 data symbols can be conveyed using slot 2.

In the first slot (slot 1), each of data symbols d(0) to d(11) is first multiplied by a 5 symbol length orthogonal code $W_i$, where $W_i = [W_i(0)\ W_i(1)\ W_i(2)\ W_i(3)\ W_i(4)]$ and distributed over the time domain. For example, a data bit can be multiplied by each of the 5 symbols and spread over the time domain. The five spread symbols for the same data symbol can mapped to the same subcarrier of five OFDM data symbols. The orthogonal codes could be 5 symbol length, although other lengths can be used, and the codes could be fully orthogonal to each other. A symbol can be complex number. Accordingly, in some embodiments, five UEs can transmit the same resource block simultaneously.

The system may use a subset of these 5 orthogonal codes if the performance is unacceptable when all codes are being used by different or the same UEs. For example, in some cases, code indices 0, 2, 4 can be used. Other subsets of code indices can be used.

Using the second slot (slot 2), each of the second 12 data symbols can be conveyed similarly to the first 12 data symbols. Compared with PUCCH format 2/2a/2b, fewer UEs can simultaneously transmit the same resource block (twelve UEs for format 2/2a/2b versus five UEs for format 3) but each UE can send more data symbols (e.g., twenty-four for format 3 instead of ten for format 2/2a/2b).

A PUCCH format 3a could be defined to use the DMRS and data mapping rules from PUCCH format 2/2a/2b. Format 3a can have DMRS position of format 1 (FIG. 2) where the DMRS pattern is positioned in the DMRS section in adjacent time slots.

Figure 5:
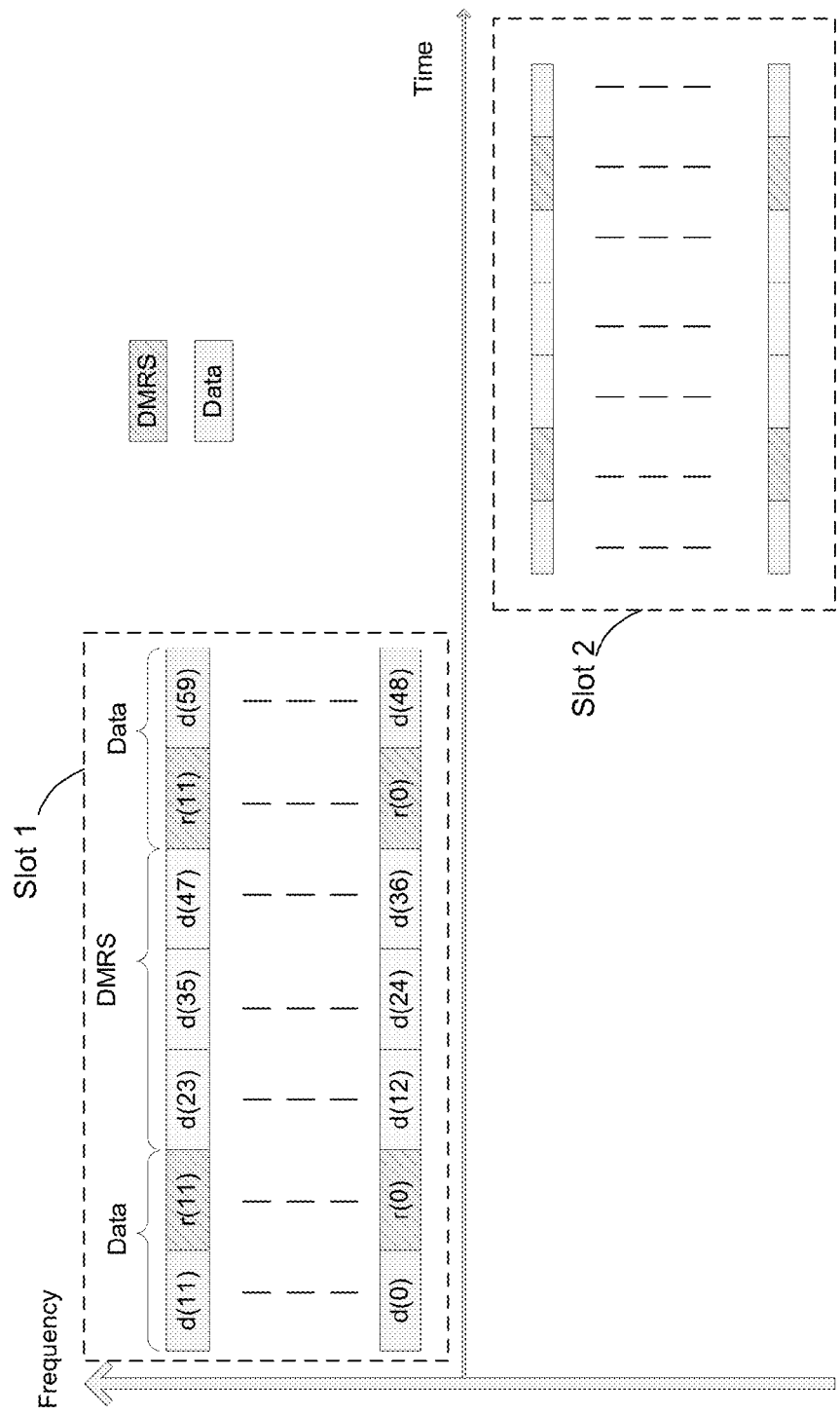
Figure 6:
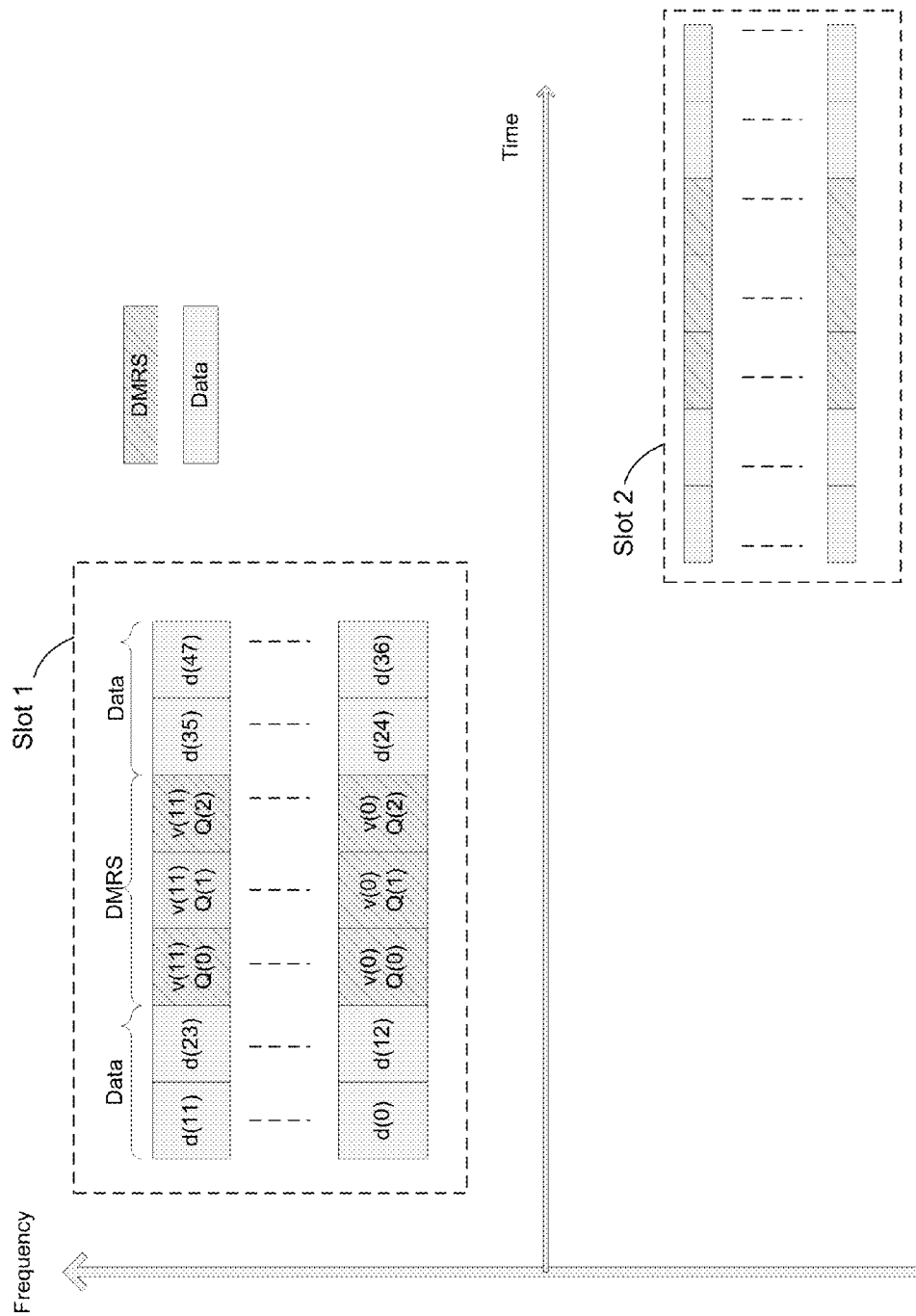

FIGS. 5 and 6 depict respective PUCCH formats 4 and 4a. For the first data orthogonal frequency-division multiplexing (OFDM) symbol of PUCCH format 4/4a, 12 data symbols can be Discrete Fourier Transform (DFT) spread to generate data symbols d(0) to d(11). Data symbols can be assigned to different frequencies and different time slots. Similar procedures apply for the rest of the data OFDM symbols. For example, 12 data symbols carried by each OFDM symbol can be DFT precoded into 12 symbols and mapped to each subcarrier. Thus, for 5 OFDM symbols, 60 data symbols can be carried. DFT spreading can maintain a low Peak to Average Power Ratio (PAPR) property of a waveform.

One difference between formats 4/4a and PUCCH 1/2/3 is that both time domain and frequency domain spreading are not used for data symbols. In other words, data symbols are not multiplied by a value that is orthogonal in the frequency domain or multiplied by a time domain orthogonal cover. This can permit simultaneous transmission by UEs of more data symbols. For example, a data symbol can be transmitted using a single sub-carrier frequency and time slot. When each data symbol is QPSK modulated, there can be 24 bits in each d(0) to d(11). The second slot of PUCCH format 4/4a (slot 2) could either carry the same data symbols of the first slot or other data symbols. If QPSK is used, PUCCH format 4a can carry 96 encoded bits in total if two slots are carrying the same 48 data symbols.

Different coding rates for PUCCH format 4a can be used to allow carrying different numbers of information bits. Coding rates for PUCCH format 4 can be {1/6, 1/4, 1/3, 1/2} and the corresponding number of information bits can be {16, 24, 32, 48}. A coding rate can represent the number of information bits divided by a total number of bits in a resource block. Different coding rates can be used for different number of downlink CCs that a PUCCH uses for feedback. PUCCH format 4 can carry 120 encoded bits if two slots are carrying the same 60 data symbols. Coding rates can be defined to be {1/6, 1/4, 1/3, 1/2} to allow the resource block to carry {20, 30, 40, 60} information bits.

Besides a larger payload size for PUCCH format 4/4a, multi user separation in PUCCH format 4/4a is also different from that of PUCCH format 1/1a/1b and PUCCH format 2/2a/2b. Spatial domain multiplexing (SDM) can be used for PUCCH format 4/4a as illustrated in FIGS. 5 and 6. SDM can refer to a format where each of the UE transmit resource blocks that do not have orthogonality in the time or frequency domain but the resource blocks have DMRS signals that are orthogonal in time or frequency domain. Two users can use different PUCCH DMRS patterns that are orthogonal over time/frequency to each other but the PUCCH for two UEs can be mapped to the same RB which are fully overlapped. By contrast, user element (UE) multiplexing in PUCCH format 1/1a/1b and PUCCH format 2/2a/2b can use Coded Division Multiplexing (CDM).

If an eNB is mounted with two receiving antennas, then the eNB can utilize a multiple-input multiple-output communications (MIMO) receiver such as Minimum Mean Square Error (MMSE) or Maximum Likelihood Detection (MLD) to separate the data portions for two UEs. If an eNB is mounted with more than two receiving antennas, it allows the eNB to simultaneously receive signals from more than two user equipment (UE). For example when resource blocks from two UEs are simultaneously transmitted and each UE has one transmission antenna and the eNB has two receiving antennas, the eNB will first estimate the channel from user elements UE1 and UE2 as respective $H_1$ and $H_2$, where each of $H_1$ and $H_2$ is a 2*1 matrix. The channel estimation can be rather accurate because the DMRS patterns for the two UEs (UE1 and UE2) are orthogonal.

After both channels are estimated, the received signal at the eNB can be described as $Y = [H_1\ H_2][d_1(0)\ d_2(0)]^T$, where $d_1(0)$ represents the first data symbol on the first subcarrier for UE1 and $d_2(0)$ represents the first data symbol on the first subcarrier for UE2. Operation $[\ ]^T$ represents a transpose operation of one matrix. This is equivalent to a 2*2 rank 2 MIMO system. The eNB can apply a MIMO decoding technique such as MMSE or MLD to estimate $d_1(0)$ and $d_2(0)$. For the eNB to determine the second data symbol for UE1 and UE2, the eNB determines $Y = [H_1 H_2][d_1(1) d_2(1)]^T$ and so forth for other data symbols. By applying the MIMO decoding technique on all sub carriers, all the data symbols from the UE can be decoded. Thus spatial division multiplexing can potentially further increase the bit rate from each UE. Consequently, an amount of simultaneous uplink feedback from UE to an eNB can be increased.

In some cases, SDM can also be applied to PUCCH format 3. For example, multiple UEs can use the same orthogonal codes $W_i$ but orthogonal DMRS patterns. Multiple UEs' data can be decoded at the eNB. The eNB receiver will first use a MIMO receiver to separate UE's data and then use dispreading on the separated data to decode each UE's data symbols.

In some embodiments, SDM can be applied to PUCCH formats 1 and 2 as well. Similar to using SDM for PUCCH format 3/3a, when using SDM for PUCCH format 1/2, multiple UEs use the same spreading codes for the data but orthogonal spreading codes for the DMRS. When an eNB receives multiple UE's data, the eNB will first estimate multiple UE's channel through the orthogonal DMRS patterns. Next, the eNB will decode each UE's spread data symbols using a MIMO receiver. Next, the eNB will decode each UE's spread data symbols and perform dispreading of each user's spreaded data symbols to decode each UE's data symbol.

Figure 7:
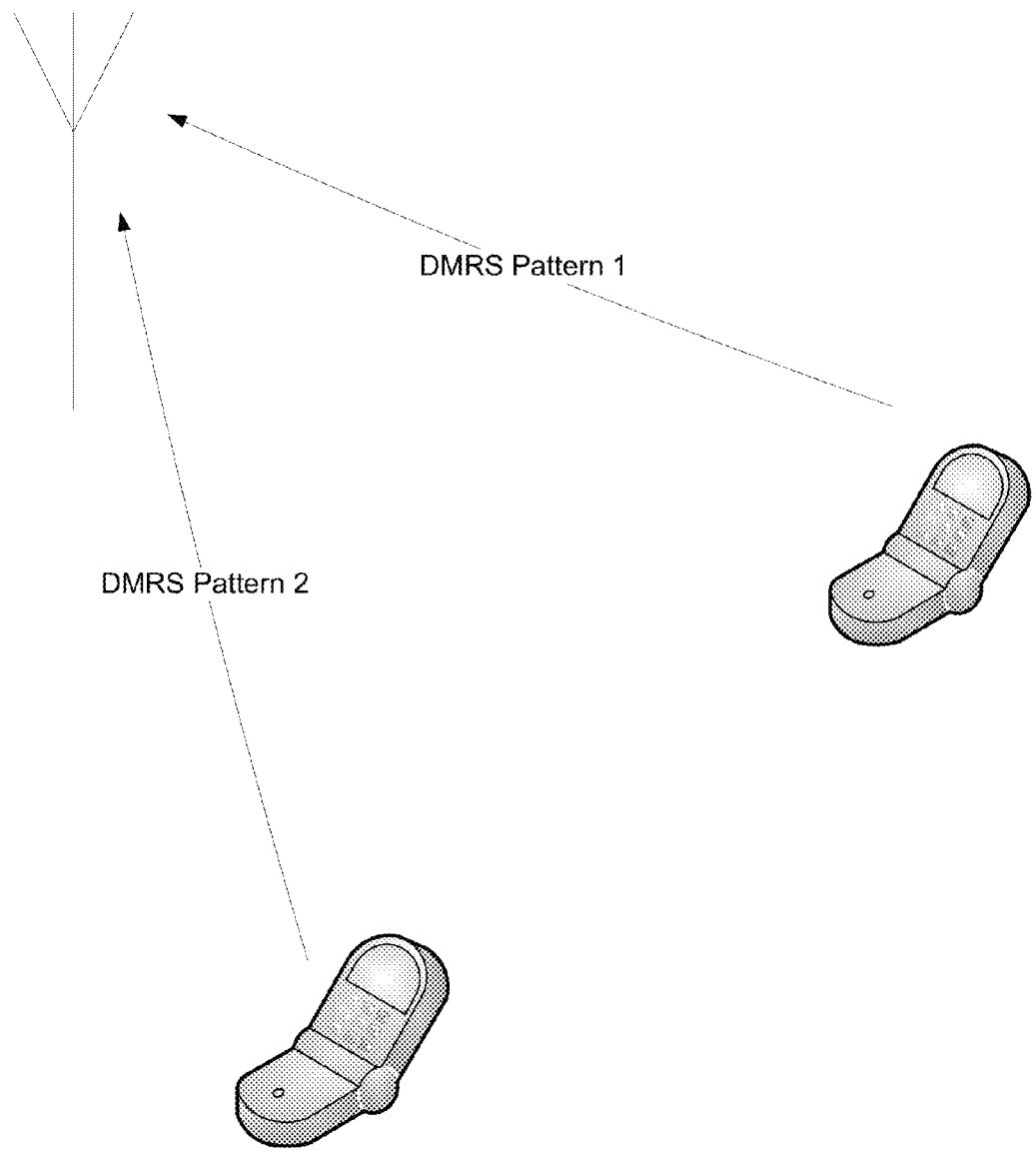
FIG. 7 depicts an example of mobile devices transmitting to a receiver using different DMRS patterns.

FIG. 7 depicts an example of mobile devices transmitting to a receiver using different DMRS patterns. Two users can use different PUCCH DMRS patterns that are orthogonal over time and/or frequency to each other but the PUCCH for two UEs can simultaneously transmit the same resource block (RB). If an eNB is mounted with two antennas, the eNB can utilize a MIMO receiver such as MMSE or MLD to differentiate resource blocks from two transmitters. If an eNB is mounted with more than two receiving antennas, an eNB can differentiate resource blocks from more than two transmitters.

Figure 8:
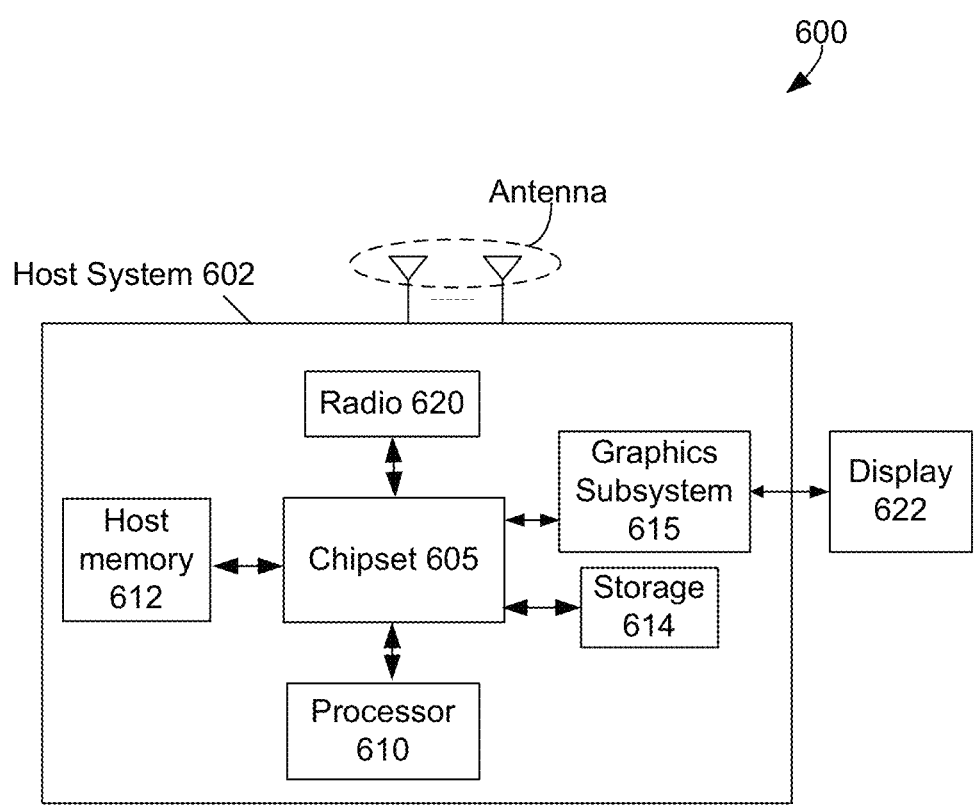
FIG. 8 provides an example of a system in accordance with an embodiment.

FIG. 8 provides an example of a system in accordance with an embodiment. Computer system 600 may include host system 602 and display 622. Computer system 600 can be implemented in a handheld personal computer, mobile telephone, set top box, or any computing device. Any type of user interface is available such as a keypad, mouse, touch screen, and/or gesture or motion recognition. Host system 602 may include chipset 605, processor 610, host memory 612, storage 614, graphics subsystem 615, and radio 620. Chipset 605 may provide intercommunication among processor 610, host memory 612, storage 614, graphics subsystem 615, and radio 620. For example, chipset 605 may include a storage adapter (not depicted) capable of providing intercommunication with storage 614.

Processor 610 may be implemented as Complex Instruction Set Computer (CISC) or Reduced Instruction Set Computer (RISC) processors, x86 instruction set compatible processors, multi-core, or any other microprocessor or central processing unit. In various embodiments, processor 610 can be configured with instructions to perform techniques described herein.

Host memory 612 may be implemented as a volatile memory device such as but not limited to a Random Access Memory (RAM), Dynamic Random Access Memory (DRAM), or Static RAM (SRAM). Storage 614 may be implemented as a non-volatile storage device such as but not limited to a magnetic disk drive, optical disk drive, tape drive, an internal storage device, an attached storage device, flash memory, battery backed-up SDRAM (synchronous DRAM), and/or a network accessible storage device.

Graphics subsystem 615 may perform processing of images such as still or video for display. An analog or digital interface may be used to communicatively couple graphics subsystem 615 and display 622. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605.

Radio 620 may include one or more radios capable of transmitting and receiving signals in accordance with applicable wireless standards such as but not limited to any version of IEEE 802.11 and IEEE 802.16. For example, radio 620 may include at least a physical layer interface and media access controller. Radio 620 can include a baseband processor to perform techniques to form resource blocks for transmission in accordance with techniques described.

Figure 9:
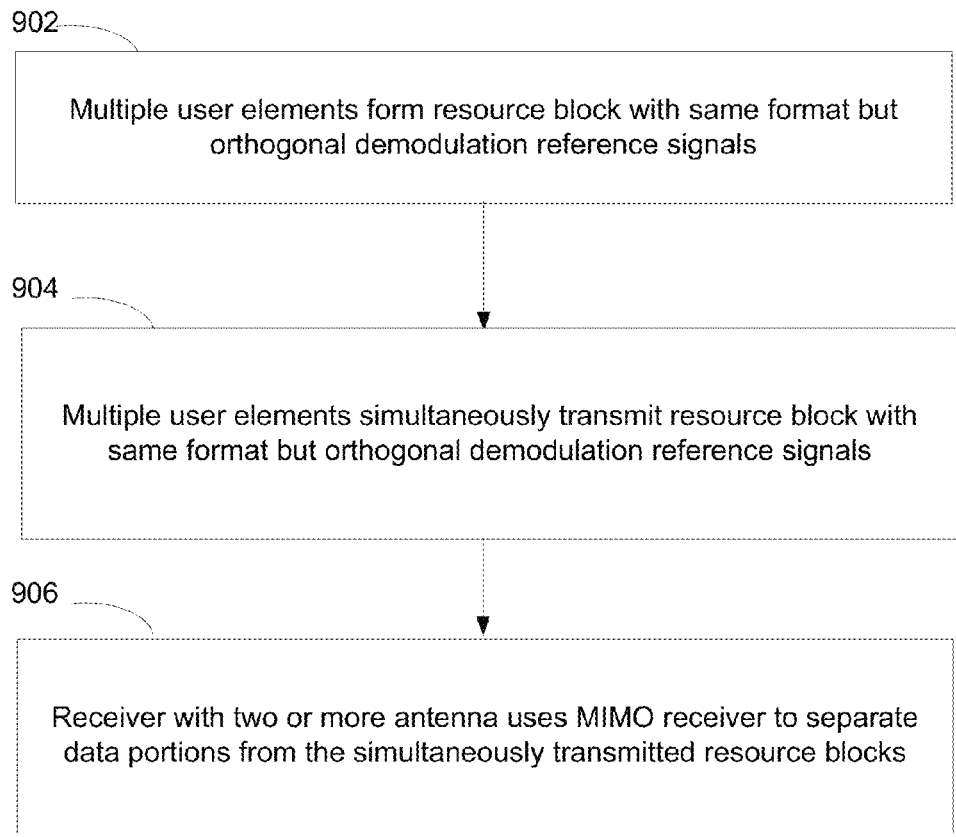
FIG. 9 depicts an example process of forming signals for transmission to a receiver.

FIG. 9 depicts an example process of forming signals for transmission to a receiver. Block 902 includes multiple user elements forming resource blocks with the same format but orthogonal demodulation reference signals. For example, user elements can simultaneously transmit resource blocks that have formats described with regard to FIGS. 4-6 but with orthogonal demodulation reference signals.

Block 904 includes multiple user elements simultaneously transmitting resource block with the same format but orthogonal demodulation reference signals.

Block 906 includes a receiver with two or more antenna using a MIMO receiver to separate data portions from the simultaneously transmitted resource blocks. The receiver can estimate the channel and then determine data symbols from each user element based on techniques described herein.

Embodiments of the present invention may be implemented as any or a combination of: one or more microchips or integrated circuits interconnected using a motherboard, hard-wired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A computer-implemented method performed using a wireless mobile computing device, the method comprising:

requesting to form a signal, the signal comprising sub-carriers on at least two different frequencies wherein a first frequency of a first sub-carrier includes at least two different time slots and wherein a second frequency of a second sub-carrier includes at least two different time slots;

requesting assignment of a first data portion to one of the time slots of the first sub-carrier;

requesting assignment of a second data portion to another of the time slots of the first sub-carrier with a first frequency; and requesting assignment of a demodulation reference signal (DMRS) pattern in each sub-carrier of the signal, the DMRS pattern in a resource block of the signal, the DMRS pattern orthogonal in frequency and time with respect to a DMRS pattern in a resource block of another signal from another device, the resource block of the signal to overlap in frequency and time with the resource block of the another signal.

2. The method of claim 1, wherein
the first data portion comprises a data symbol multiplied by a value that is orthogonal in the frequency domain and
the second data portion comprises a data symbol multiplied by a value that is orthogonal in the frequency domain.

3. The method of claim 1, wherein
the first data portion comprises a data symbol multiplied by a time domain orthogonal cover and
the second data portion comprises a data symbol multiplied by a time domain orthogonal cover.

4. The method of claim 1, wherein
the first data portion comprises a Discrete Fourier Transform precoded data symbol and
the second data portion comprises a second Discrete Fourier Transform precoded data symbol.

5. The method of claim 1, wherein the DMRS pattern comprises at least one frequency orthogonal code.

6. The method of claim 1, wherein the DMRS pattern comprises a plurality of frequency orthogonal codes that are not in adjacent time slots.

7. The method of claim 1, wherein the DMRS pattern comprises a product of time orthogonal and frequency orthogonal values and the DMRS pattern are allocated in adjacent time slots.

8. A computer-implemented method performed using a wireless computing device, the method comprising:
receiving first and second resource blocks from respective first and second user elements, the first and second resource blocks each including orthogonal demodulation reference signal (DMRS) patterns, the DMRS pattern of the first resource block to overlap in time and frequency domains with the DMRS pattern of the second resource block;
requesting estimation of the channels used for transmission of the first and second resource blocks; and
requesting determination of data values from the first and second resource blocks based in part on the estimation.

9. The method of claim 8, further comprising:
using multiple-input multiple-output communications (MIMO) techniques to separate the data portions for multiple user elements.

10. The method of claim 9, wherein the using MIMO techniques comprises using Minimum Mean Square Error (MMSE) or Maximum Likelihood Detection (MLD).

11. The method of claim 8, wherein the first and second resource blocks include data portions and each of the data portions comprise one of: a data symbol multiplied by a value that is orthogonal in the frequency domain, a data symbol multiplied by a time domain orthogonal cover, and a Discrete Fourier Transform precoded data symbol.

12. The method of claim 8, wherein the DMRS patterns comprise one of:
frequency orthogonal codes, frequency orthogonal codes that are not in adjacent time slots, and a product of time orthogonal and frequency orthogonal values allocated in adjacent time slots.

13. A system comprising:
at least one antenna;
a radio communicatively coupled to the at least one antenna; and
a processor configured to:
request to form a signal, the signal comprising sub-carriers on at least two different frequencies wherein a first frequency of a first sub-carrier includes at least two different time slots and wherein a second frequency of a second sub-carrier includes at least two different time slots;
request assignment of a first data portion to one of the time slots of the first sub-carrier;
request assignment of a second data portion to another of the time slots of the first sub-carrier with a first frequency; and
request assignment of a demodulation reference signal (DMRS) pattern in each sub-carrier of the signal, the DMRS pattern to be in a resource block of the signal, the DMRS pattern to be orthogonal in frequency and time with respect to a DMRS pattern in a resource block of another signal from another device, the resource block of the signal to overlap in frequency and time with the resource block of the another signal.

14. The system of claim 13, wherein
the first data portion comprises a data symbol multiplied by a value that is orthogonal in the frequency domain and
the second data portion comprises a data symbol multiplied by a value that is orthogonal in the frequency domain.

15. The system of claim 13, wherein
the first data portion comprises a data symbol multiplied by a time domain orthogonal cover and
the second data portion comprises a data symbol multiplied by a time domain orthogonal cover.

16. The system of claim 13, wherein
the first data portion comprises a Discrete Fourier Transform precoded data symbol and
the second data portion comprises a second Discrete Fourier Transform precoded data symbol.

17. The system of claim 13, wherein
the DMRS pattern comprises at least one of: at least one frequency orthogonal code, a plurality of frequency orthogonal codes that are not in adjacent time slots, or a product of time orthogonal and frequency orthogonal values and the DMRS pattern are allocated in adjacent time slots.

18. A system comprising:
at least two antennas;
a radio communicatively coupled to the at least two antenna; and
a processor configured to:
process first and second resource blocks, the first resource block associated with a first user element and the second resource block associated with a second user element, the first and second resource blocks each including orthogonal demodulation reference signal (DMRS) patterns, the DMRS pattern of the first resource block to overlap in time and frequency domains with the DMRS pattern of the second resource block,
request estimation of the channels used for transmission of the first and second resource blocks, and
request determination of data values from the first and second resource blocks based in part on the estimation.

19. The system of claim 18, further comprising:
a multiple-input multiple-output communications (MIMO) receiver to separate the data portions for multiple user elements, wherein the MIMO receiver uses Minimum Mean Square Error (MMSE) or Maximum Likelihood Detection (MLD).

20. The system of claim 18, wherein the first and second resource blocks include data portions and each of the data portions comprise one of: a data symbol multiplied by a value that is orthogonal in the frequency domain, a data symbol multiplied by a time domain orthogonal cover, and a Discrete Fourier Transform precoded data symbol.

21. The method of claim 18, wherein the DMRS patterns comprise one of:
frequency orthogonal codes, frequency orthogonal codes that are not in adjacent time slots, and a product of time orthogonal and frequency orthogonal values allocated in adjacent time slots.

* * * * *

UNITED STATES PATENT AND TRADEMARK OFFICE
CERTIFICATE OF CORRECTION

| | | |
|---|---|---|
| PATENT NO. | : 8,483,203 B2 | Page 1 of 1 |
| APPLICATION NO. | : 12/962045 | |
| DATED | : July 9, 2013 | |
| INVENTOR(S) | : Yuan Zhu | |

It is certified that error appears in the above-identified patent and that said Letters Patent is hereby corrected as shown below:

In the Claims

Column 11, line 3: replace "The method of claim 18" with "The system of claim 18"

Signed and Sealed this
Eleventh Day of March, 2014

Michelle K. Lee
*Deputy Director of the United States Patent and Trademark Office*